United States Patent [19]
Vian-Ortuno et al.

[11] 3,745,668
[45] July 17, 1973

[54] APPARATUS FOR INTERACTING PARTICULATE MATERIAL WITH GAS

[75] Inventors: Angel Vian-Ortuno; Vicente Martin-Municio, both of Madrid, Spain

[73] Assignee: Empresa Auxiliar De La Industria S.A., Madrid, Spain

[22] Filed: May 20, 1970

[21] Appl. No.: 39,060

Related U.S. Application Data

[62] Division of Ser. No. 622,018, March 2, 1967, abandoned.

[30] Foreign Application Priority Data

Mar. 1, 1966 Spain .................................. 323698

[52] U.S. Cl................................................. 34/57 A
[51] Int. Cl............................................. F26b 17/10
[58] Field of Search.................. 34/57 A, 10, 57 R, 34/57 C; 263/21 A; 23/288.3 S, 284

[56] References Cited
UNITED STATES PATENTS

| | | | |
|---|---|---|---|
| 3,391,913 | 7/1968 | Jones | 34/57 A X |
| 2,419,245 | 4/1947 | Arveson | 34/57 A X |
| 2,529,366 | 11/1950 | Bauer | 263/21 A |
| 2,433,726 | 12/1947 | Angell | 34/57 A X |
| 2,797,908 | 7/1957 | Zubrzycki | 34/57 A X |

Primary Examiner—Meyer Perlin
Assistant Examiner—William C. Anderson
Attorney—Michael S. Striker

[57] ABSTRACT

Apparatus for interacting particulate material with gas in which particulate material is fed into one end of an elongated chamber and discharged from the opposite end thereof, while gas under pressure is fed through the perforated bottom wall of the chamber so that the particulate material fed into the chamber will form a fluidized bed of such material therein which flows from the one to the opposite end of the chamber. The space in the chamber immediately above the bed is divided by a plurality of transverse partition in successive zones preventing particulate material which is carried by the gas upwardly out of the fluidized bed to pass from one to another zone while permitting unobstructed flow of the material in the fluidized bed from one to the opposite end of the elongated chamber to assure thereby uniform treatment of the particulate material during its pasage through the chamber.

13 Claims, 4 Drawing Figures

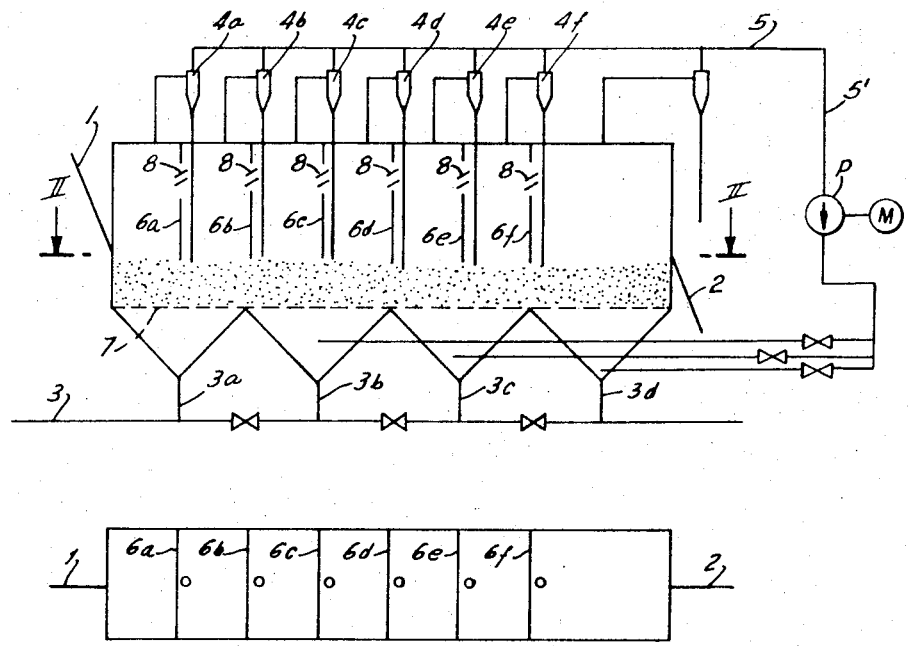
FIG. 1
FIG. 2
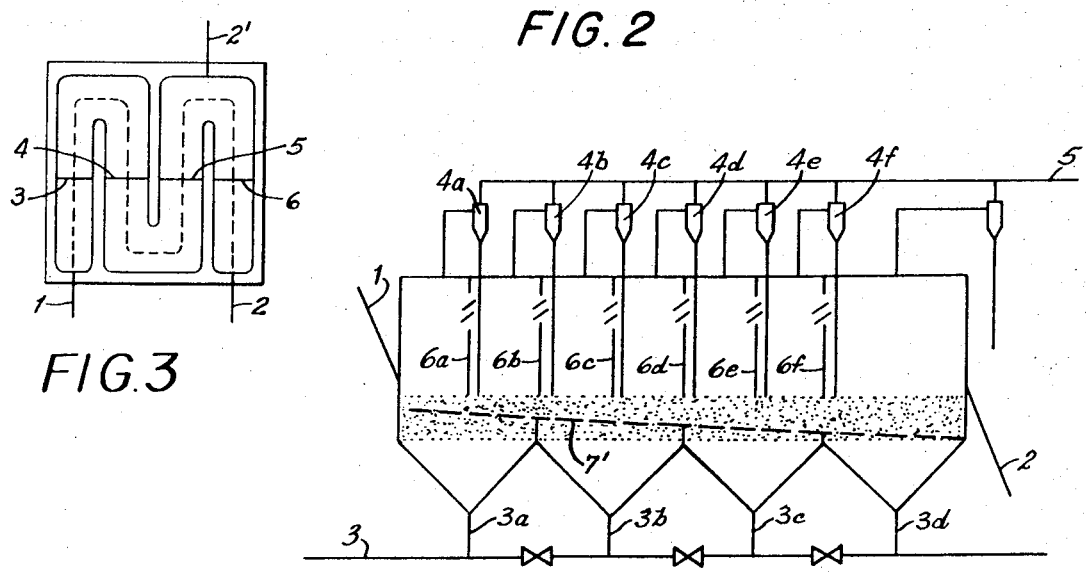
FIG. 3
FIG. 4
INVENTOR
ANGEL VIAN ORTUNO
VICENTE MARTIN MUNICIO

APPARATUS FOR INTERACTING PARTICULATE MATERIAL WITH GAS

CROSS REFERENCES TO RELATED APPLICATIONS

The present application is a divisional application of the copending application, Ser. No. 622,018, filed on Mar. 2, 1967, and now abandoned.

BACKGROUND OF THE INVENTION

The present invention relates to apparatus for interacting particulate material with gas.

There are three principle factors which influence the reaction between a gas and particulate material, i.e., the particle size of the particulate material, the form of contact between the gas and the material, and the transformation of the particulate material under the influence of the gas.

Fluidized beds have advantageously been used for interacting particulate material with gas, which permit not only a very rapid and effective mixture of the gas with the particulate material, but also a mixture of all particles of the bed with each other.

While a good mixture of the gas and the particulate material is always advantageous, the intermixing of particles which by the reaction of the gas has been transformed to a different degree may cause considerable difficulties if secondary reactions between such particles are possible.

From a practical point of view, particulated material can be treated in a continuous operation in a fluidized bed to produce an end product in which all particles are completely transformed only if the residence time of the particulated material in the bed is very long, theoretically infinite, that is the dimensions of the fluidized bed have to be very large in relation to the feeding or production speed. As such an arrangement causes a considerable increase in the initial cost of the apparatus, apparatus have been deviced which include a plurality of beds, juxtaposed or superposed, or in which the bed is divided in a plurality of beds by transverse walls.

Such apparatus is however not desirable in many applications. For instance, in the roasting of arsenic pyrite ores, in which the coexistence of particles which are fully oxidized ($Fe_2O_3$) provokes the binding of the arsenic compounds eliminated from the particles newly fed into the bed, the division of the beds promotes the dangerous phenomenon of sinterization, because overheated zones are formed at those points at which the distrubution of particles and gases is interrupted and which causes the particles to sinter together. If the process is accomplished in two or more beds in separate apparatus, so as to avoid the division of the bed, the installation costs are high and the difficulty of providing communication between the beds arises. In any case, the transformation of the particulated material is gradually achieved, each step of such transformation in each section of the bed or in the successive beds, and not, as preferable, in a continuous manner.

By means of extended, theoretical and practical study about the kinetics of fluidized beds we arrived at the conclusion that fluidized contact can be obtained in a single bed in which the particulate material fed thereinto is gradually transformed in a continuous and controlled manner by avoiding the tendency of particles to mix with each other in the bed. While such a mixture is sometimes desirable, it is undesirable in the method according to the present invention.

According to our experience, there are two reasons which provoke an undesired mixture of the particles composing a fluidized bed, that is,:

1. The mechanical agitation of the particles resulting from the fluidization and which is achieved according to the well known laws of turbulent distribution; and
2. the jumping of particles upwardly out from the fluidized bed into the space above the same in which the particles describe parabolas more or less altered by mutual shocks and fall down at locations far away from the points at which they were discharged from the bed.

SUMMARY OF THE INVENTION

It is an object of the present invention to provide apparatus for interacting particulate material with gas in a fluidized bed in which the interaction between the particulate material and the gas can be carried out in a continuous fully controlled manner.

It is a further object of the present invention to provide for an apparatus for interacting particulated material with gas in which intermixing of particles which have been transformed by the gas to a different degree is positively avoided.

It is an additional object of the present invention to provide for such an apparatus which can be manufactured at a cost which is small as compared with apparatus for this purpose known in the prior art.

With these objects in view, the apparatus according to the present invention for interacting particulate material with gas mainly comprises means for maintaining a fluidized bed including elongated chamber means having a perforated bottom wall and means for blowing gas under pressure through the perforated bottom wall, means for feeding particulate material into one end of the elongated chamber means and for discharging such material from the opposite end thereof for thus creating a flow of the fluidized material from one to the other end of the elongated chamber means, and a plurality of partition means in the elongated chamber means extending transverse to the elongation thereof for dividing the space immediately above the fluidized bed into a plurality of zones for preventing particulate material which escapes upwardly from the bed to pass from one to another zone while permitting the particulate material in the bed to flow unobstructed from the one to the opposite end of the elongated chamber means.

Preferably, the ratio of the length to the width of the elongated chamber means is at least 3:1 which will enhance movement of the particles in the fluidized bed in longitudinal direction of the same, and thus reduce undesired intermixing of the particles which have been treated by gas to a different degree. The partitions in the space above the fluidized bed, on the other hand, assures that particles which are carried out by the gas in upward direction from the bed cannot advance upstream or move upstream great distances.

In this way an adequate gradation of the composition of the particles is obtained and the difficulties resulting from a premature mixture of particles in different transformation stages are eliminated, which in apparatus known in the art have required division of the fluidized bed or the arrangement of a plurality of separate fluidized beds.

The establishment of the desired and characteristical graduation of the compositions of the particles in the fluidized bed obtained with the apparatus according to our invention, which we call fludized tunnel bed, is enhanced, as established by our experiments, by a high feeding rate of the particulate material. Therefore, our process is especially applicable to processes requiring a large output, for instance roasting of sulfites, chlorination of ores, lixiviation of ores, etc. or physical and chemical processes as for instance the absorption of vapors by solid absorbents, the dessication of solids, etc.

It is clear that a high feeding rate results in a short residence time of the solids, in the bed, but this can be prolonged in order to make it compatible with the desired transformation degree, by diminishing the grain size, or by increasing one of the three dimensions of the bed, i.e., the height, the width or the length thereof. According to our invention it is preferred to increase the length which should be at least three times of the width of the bed. A good fluidization imposes certain ratios of height to width, which, as is known, depend on the grain size.

If, on the contrary, it is desired to diminish the residence time of the particles, the perforated bottom wall or grid of the elongated chamber may be inclined towards the discharge end, without the necessity to alter the optimum dimensions of the bed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagrammatic sectioned side view of the apparatus according to the present invention;

FIG. 2 is a schematic section taken along the line II—II of FIG. 1;

FIG. 3 is a schematic top view of a modified arrangement; and

FIG. 4 is a diagrammatic sectional side view of a modification of the apparatus shown in FIG. 1.

DESCRIPTION OF THE PREFERRED EMBODIMENTS

Referring now to the drawing and especially to FIGS. 1 and 2 of the same, it will be seen that the apparatus according to the present invention comprises an elongated chamber having a length considerably greater than the width thereof into which particulated material is continuously fed through the inlet means 1 into one end of the elongated chamber while particulate material is continuously discharged at 2 from the opposite end of the chamber. Fluidizing gases are injected from a supply line 3 at spaced locations 3a, 3b, 3c and 3d through the perforated bottom wall or grid 7 of the elongated chamber to form a fluidized bed from the material on the grid 7 and since particulated material is continuously fed at one end into the elongated chamber and discharged at 2 from the opposite end thereof, the particulated material forming the fluidized bed will continuously flow from the left to the right end of the bed, as viewed in FIG. 1, while being treated by the fluidizing gases passing in upward direction through the bed. If it is desired to limit the residence time of the particles in the apparatus, the grid may be inclined toward the discharge end as shown at 7' in FIG. 4.

In order to avoid that particles which are carried by the fluidizing gases in upward direction out of the bed move in an erratic manner essentially different from the manner in which the particles in the fluidized bed move, the air space in the elongated chamber above the fluidized bed is divided by a plurality of transverse partitions 6a–6f into a plurality of zones, and such partitions will prevent particles carried out through the fluidized bed from moving from one to another zone. The partition walls 6a–6f may be provided each in an upper portion thereof with openings 8 in order to equalize the gas pressure in the plurality of zones.

The fluidizing gases are discharged by conduits from the upper end of each zone and these conduits are preferably connected respectively to cyclons 4a–4f to separate fines carried by the discharged gases from the latter, and such fines are preferably returned by conduits connected to the bottom discharge ends of the cyclons into the fluidized bed, whereas the gases emanating from the top ends of the cyclons are discharged through a common conduit 5, as shown in FIG. 1 or through separate conduits.

While FIG. 1 shows four gas inlet points, it is evident that the number of such gas inlet points may be greater or smaller than four. It is also possible to inject through each of the gas inlet points gases which differ from each other in composition and/or temperature. For instance, if the apparatus of the present invention is used to dry solid particles which are sensible to heat or which have special properties, then gases may be injected at each inlet point in which the temperature of the gas increases from one inlet point to the next toward the discharge end of the apparatus so that the residence time of the particles in the high temperature gas can be held at a minimum. In certain cases it is also of interest to recycle wet gases through some of the sections so as to control the degree of dessication and to obtain homogeneous drying of all the wet particles. For this purpose a conduit 5' may be connected to the common conduit 5, and a pump P located in the conduit 5', driven by a motor M leads the wet gases through a plurality of conduits back at spaced locations beneath the perforated bottom wall 7.

If the flow rate of the fluidized gas becomes too high by such additional recirculation, the corresponding section can be enlarged in width and/or length. The same feature can be used if the kinetics of some phase of the transformation of the particles make a longer residence time under predetermined conditions advisable. On the other hand, the width of a portion of the elongated chamber can be reduced, so that the contact time between the particles and the fluidizing gases in this zone is shorter than in the rest of the elongated bed.

We have found that in the roasting of arseno pyrite ores in the apparatus of our invention, dearsenication is automatically obtained because in the major part of the length of the tunnel furnace the roasting is achieved with an insufficient amount of air, which effect is diminished in proportion with the advance of the mineral, i.e., the more the transformation process of the ores proceeds, till a point is reached where the roasting takes place with excess of oxygen. At this point, if the roasting temperature is maintained intentionally low, for instance between 650°–750°C by introduction of refrigeration means or by a spray of water or by recycling of part of the sulfurous gases produced in the furnace proper, or of gases which are of other origin, the sulfating process of copper and zinc which may be contained in the ores can be carried out and these elements be made easily soluble and profitable by leaching of the roasted ore particles, without being able to eliminate the sulfide of the ore.

In the apparatus according to the present invention it is not necessary to use roasting air in excess as in typical roasting methods for the removal of the remaining sulfur in the cinders because the furnace may end very soon after that point of its length at which an excess of air exists. Therefore, the sulfurous gases may be more concentrated than usual, considering all the gases proceeding from the various sections of the furnace.

It will be also easily appreciated that the form of realizing contact of gas with the particulated material which we propose offers various advantageous applications, besides the mentioned examples which must be considered included in the present invention. For instance, applications may be of interest in which the gases are separately discharged from each of the subsequent zones, if, for instance, the upper ends of the cyclons are not connected by a common conduit, but if separate discharge conduits are provided for each cyclon.

If pyrites are treated in the apparatus according to the present invention, hot, non-oxidizing gases, for instance gases resulting from a regulated combustion may be introduced into the portion of the elongated chamber adjacent the inlet end thereof, so as to distill off the labile sulfur of the pyrite which can be condensed together with the volatile sulfides of arsenic and lead, which are impurities of the ores, and which can be recovered by cooling the gas stream emanating from the first zone and which in this case is withdrawn separately from the other gases produced in the apparatus when roasting the pyrrhotite resulting from the distillation of the labile sulfur of pyrite. In this case, the necessity to fractionate the gas outlet would be imposed by the desire of obtaining elementary sulfur, avoiding its contact with the oxygen of the roasting zone and moreover avoiding its excessive dilution with the remainder of the gases.

If the pyrites contain certain proportions of copper and zinc, the recovery of which may be of interest, cold gases resulting from the proper roasting thereof, and which are therefore rich in $SO_2$ are injected through the gas inlet correspoinding to the zone where the roasting of the ores is almost complete, and the produced gases show already traces of oxygen, whereby the working atmosphere in this zone takes such a high value of the sulfating product ($pSO_2 \times pO_2^{0.5}$) that if the temperature is regulated adequately, (650°–750°C) the mentioned metals become sulfated and can be recovered by subsequent aqueous leaching of the cold ferric cinders.

It is evident that the partition walls which are subdividing the upper gas space in the chamber ought not to be perforated, but must be continuous if withdrawing of separate gas fractions is desired.

The arrangement of a long stretched out bed as proposed in our invention will result in a high ratio of surface to volume. Therefore, a cooling and/or heating device with a suifficient heat-exchange surface may be easily installed in such a bed, regardless how high the thermal requirements of the process may be. Such heating or cooling devices may be incorporated into plates placed against the walls defining the elongated chamber, or such heating or cooling devices may be incorporated in the walls of the furnace itself, or in plates in the center of the bed which extend in the longitudinal direction of the bed, i.e. in the direction of movement of the particles through the bed so as not to interfere with the flow of such particles. The partition walls 6a–6f may also be utilized for the introduction or the reduction of heat of the bed if they are built as double walls and if through the space between the double walls streams of a hot or cold fluid is circulated.

In order to make all parts of the apparatus more easily accessible and to reduce the thermal losses through the exterior walls, the necessary length of the reaction path may be obtained with an arrangement as schematically shown in FIG. 3 in which the walls of the furnace chamber form a labyrinth path and such an arrangement will be especially advantageous if the reactions of the process require the presence of any heating or cooling elements which can be easily installed in the walls forming the labyrinth. FIG. 3 diagramatically illustrates in cross section seen from above an arrangement in form of such a labyrinth in which the particulate material is fed into the chamber at the inlet 1 at one end of the labyrinth path, and discharged at 2 at the other end of this path. Lines 3, 4, 5 and 6 correspond to the partition walls 6a–6f shown in FIG. 1, and it is understood that these partition walls likewise have lower edges located in the region of the upper level of the fluidized bed. It is also to be understood that introduction of fluidizing gases into the various portions of the fluidized bed may be carried out in a manner substantially as described in connection with FIG. 1, and the fluidizing gases may be discharged from the upper spaces of the various zones formed by the partition walls also in the manner as described in connection with FIG. 1, whereby as mentioned above, the gases from the separate zones may be discharged from the upper spaces of the various zones formed by the partition walls also in the manner as described in connection with FIG. 1, whereby as mentioned above, the gases from the separate zones may be discharged together or individually. It is also possible to discharge a certain amount of particulate material in an intermediate transformation stage, if such is desired, by providing additional outlet means 2' at a portion of the elongated path intermediate the inlet 1 and the outlet 2.

It will be understood that each of the elements described above, or two or more together, may also find a useful application in other types of apparatus for interacting particulate material with gas differing from the types described above.

While the invention has been illustrated and described as embodied in apparatus for interacting particulate material with gas in a single elongated fluidized bed of such material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for varous applications without omitting features that, from

What is claimed as new and desired to be protected by Letters Patent is set forth in the appended claims:

1. An apparatus for interacting particulate material with gases, particularly for the roasting of sulfides, comprising in combination a fluidizing chamber having an input end and an output end and defining between said ends a continuous flow passage free of flow obstructions for the continuous and unobstructed free flow of fluidized particulate material from said input end to said output end, said chamber further having a perforated bottom wall; means for blowing fluidizing gas into said chamber through said perforated bottom wall to create a fluidized bed of particulate material; feeding means for feeding particulate material into said input end of said fluidizing chamber; outlet means at said output end of said fluidizing chamber for discharging particulate material from said output end and for establishing the upper level of said fluidized bed at a level below the top of said chamber so as to divide the contents of said chamber into a lower fluidized-solids phase and an upper substantially gaseous phase; and a plurality of partitions located in the upper portion of said chamber spaced in direction from said input to said output end, said partitions having lower ends located in the immediate vicinity of said upper level of said fluidized bed, for dividing the portion of said chamber accommodating said upper substantially gaseous phase into a plurality of distinct zones to prevent particulate material escaping upwardly from the bed from passing from one zone to the next, while at the same time presenting no obstruction to the flow of the fluidized particulate material from said input end to said output end within the fluidized-solids phase.

2. An apparatus as defined in claim 1, wherein said fluidizing chamber is an elongated chamber and wherein said continuous flow passage is an elongated straight flow passage.

3. An apparatus as defined in claim 2, wherein said flow passage is of generally rectilinear configuration.

4. Apparatus as defined in claim 1, wherein said partitions are formed with openings permitting equalization of the gas pressure in the space above the bed in the plurality of zones to thereby maintain the level of said bed substantially constant over its length.

5. Apparatus as defined in claim 1, wherein the ratio of the length to the width of the means chamber means is at least 3:1.

6. Apparatus as defined in claim 1, wherein said perforated bottom wall is inclined downwardly toward said output end of said chamber.

7. Apparatus as defined in claim 1, wherein said chamber comprises walls constructed to act as heat conductors.

8. Apparatus as defined in claim 1, wherein said elongated chamber means has a serpentine configuration.

9. Apparatus as defined in claim 1 and including means for discharging gas and any fines carried by the gas to the upper end of each of said zones.

10. Apparatus as defined in claim 9, and including means for separating the fines carried by the gas from the latter.

11. Apparatus as defined in claim 10 wherein said separating means comprise cyclons.

12. Apparatus as defined in claim 10, and including means for returning said fines separated from the discharged gas to the fluidized bed.

13. Apparatus as defined in claim 9, and including means for recycling used gas back to the fluidized bed.

* * * * *